(12) United States Patent
Tsubouchi et al.

(10) Patent No.: US 11,286,406 B2
(45) Date of Patent: Mar. 29, 2022

(54) ADHESIVE TAPE

(71) Applicant: TERAOKA SEISAKUSHO CO., LTD., Tokyo (JP)

(72) Inventors: Issei Tsubouchi, Tokyo (JP); Yasushi Tsuchiya, Tokyo (JP)

(73) Assignee: TERAOKA SEISAKUSHO CO., LTD., Tokyo (JP)

( * ) Notice: Subject to any disclaimer, the term of this patent is extended or adjusted under 35 U.S.C. 154(b) by 93 days.

(21) Appl. No.: 16/642,623

(22) PCT Filed: Aug. 30, 2017

(86) PCT No.: PCT/JP2017/031062
§ 371 (c)(1),
(2) Date: Feb. 27, 2020

(87) PCT Pub. No.: WO2019/043810
PCT Pub. Date: Mar. 7, 2019

(65) Prior Publication Data
US 2020/0239740 A1  Jul. 30, 2020

(51) Int. Cl.
*C09J 7/26* (2018.01)
*C09J 7/38* (2018.01)

(52) U.S. Cl.
CPC ............... *C09J 7/26* (2018.01); *C09J 7/385* (2018.01); *C09J 2203/326* (2013.01); *C09J 2301/414* (2020.08); *C09J 2400/243* (2013.01); *C09J 2423/006* (2013.01); *C09J 2433/00* (2013.01)

(58) Field of Classification Search
None
See application file for complete search history.

(56) References Cited

U.S. PATENT DOCUMENTS

| | | |
|---|---|---|
| 2014/0356615 A1 | 12/2014 | Komatsuzaki et al. |
| 2015/0050477 A1 | 2/2015 | Komatsuzaki et al. |
| 2015/0086767 A1 | 3/2015 | Komatsuzaki et al. |
| 2015/0132558 A1 | 5/2015 | Iwasaki et al. |
| 2018/0237673 A1 | 8/2018 | Tsuchiya et al. |

FOREIGN PATENT DOCUMENTS

| | | |
|---|---|---|
| JP | S5941338 A | 3/1984 |
| JP | S5991178 A | 5/1984 |
| JP | S5991179 A | 5/1984 |

(Continued)

OTHER PUBLICATIONS

Masaki, K. ., Crosslinked Polyolefin Resin Foamed Sheet, Feb. 13, 2014, machine translation of JP2014-028925 (Year: 2014).*

(Continued)

*Primary Examiner* — Chinessa T. Golden
(74) *Attorney, Agent, or Firm* — Law Office of Katsuhiro Arai

(57) ABSTRACT

Disclosed is an adhesive tape having an adhesive layer on one side or both sides of a polyolefin-based foam substrate containing closed cells, wherein the 65% compressive strength measured by compressive strength measurement according to JIS K 7181 is 6.0 MPa or less and the 80% compressive strength thereof is 20 MPa or less. This adhesive tape is excellent in flexibility at high compression, and excellent in performances such as, for example, impact resistance and, stability when deformed greatly.

9 Claims, 3 Drawing Sheets

(56) References Cited

FOREIGN PATENT DOCUMENTS

| | | | |
|---|---|---|---|
| JP | H0341179 A | | 2/1991 |
| JP | H09239882 A | | 9/1997 |
| JP | 2013053179 A | * | 3/2013 |
| JP | 2014028925 A | * | 2/2014 |
| JP | 2015098544 A | * | 5/2015 |
| JP | 2015098554 A | | 5/2015 |
| JP | 2015187263 A | | 10/2015 |
| JP | WO2013191106 A1 | | 5/2016 |
| JP | 2016183274 A | | 10/2016 |
| JP | WO2014156816 A1 | | 2/2017 |
| JP | 2017066404 A | | 4/2017 |
| WO | 2013099755 A1 | | 7/2013 |
| WO | 2013141167 A1 | | 9/2013 |
| WO | 2013154137 A1 | | 10/2013 |
| WO | 2013176031 A1 | | 11/2013 |
| WO | 2013191106 A1 | | 12/2013 |
| WO | 2014156816 A1 | | 10/2014 |
| WO | 2017033274 A1 | | 3/2017 |

OTHER PUBLICATIONS

Miyazaki, K. et al., Crosslinked Polyolefin Resin Foamed Sheet, Mar. 21, 2013, machine translation of JP2013-053179 (Year: 2013).*
Fukazawa, O. et al., Waterproof Tape, May 28, 2015, machine translation of JP2015-098554 (Year: 2015).*
International Search Report (ISR) dated Oct. 10, 2017, issued for International application No. PCT/JP2017/031062. (2 pages).

\* cited by examiner

ADHESIVE TAPE

TECHNICAL FIELD

The present invention relates to an adhesive tape which is excellent in flexibility at high compression, and excellent in performances such as impact resistance and stability when deformed greatly.

BACKGROUND ART

Portable electronic devices such as smartphones and tablet terminals generally have a structure in which a touch panel and a housing accommodating a liquid crystal module are combined. For example, an adhesive tape is used to fix the touch panel and the housing. Further, in electronic devices such as a vehicle-mounted display device and a TV, an adhesive tape is used to fix a liquid crystal display (LCD) panel or an organic EL panel to a housing.

In recent years, these electronic devices are becoming thinner, smaller, and more complexly designed. Accordingly, for example, FPCs (Flexible Printed Circuits) are bent at a sharper angle in the device, forming an internal structure in which a strong repulsive force is always applied. Further, for enlarging the display area of the LCD, the so-called frame narrowing in which the width of a frame (picture frame) surrounding the liquid crystal panel is narrowed is progressing. In addition, with the complexity of electronic device design, LCD panels designed in a curved manner are increasing. Hence, an adhesive tape for fixing a housing and a top panel is also required to be narrowed and to have improved followability to a curved one. However, not only the adhesive strength of an adhesive layer but also the strength of a substrate is required to withstand the repulsive force by a FPC from the inside and the impact from the outside.

When a substrate of an adhesive tape having narrow width is insufficient in strength, the adhesive tape is greatly deformed in the thickness direction, and a breakdown occurs between layers due to internal stress or external stress, and the device is damaged, in some cases. Additionally, when pasting to a housing, dimensional stability is inferior and it becomes a cause which generates twist. In contrast, when a substrate is too hard, the tape cannot follow the curved adherend, peeling of the adhesive tape occurs, and the device is damaged, in some cases.

By the way, as a substrate of this kind of adhesive tape, a polyolefin-based foam containing polyethylene as a main component or an acrylic foam obtained by adding various fillers to an acrylic resin is generally used. For example, Patent Literature 1 describes a waterproof double-sided tape having an adhesive layer on at least one side of a foam substrate. It is described that this foam substrate is preferably a polyolefin-based foam, particularly a polyethylene-based foam, and the interlayer strength thereof is preferably 6 to 50 N/cm and the 25% compressive strength is preferably 30 to 500 kPa.

Patent Literature 2 describes an adhesive sheet having an adhesive layer on one side or both sides of a foam substrate and used for fixing a housing and components at the time of manufacturing an electronic device. It is described that this foam substrate is preferably a polyolefin-based foam, particularly a polyethylene-based foam, and the interlayer strength thereof is preferably 20 N/cm or more and the 25% compressive strength is preferably 80 kPa or more.

Patent Document 3 describes a double-sided adhesive tape for impact resistance having an adhesive layer on both sides of a foam substrate. It is described that this foam substrate is preferably a polyolefin-based foam, particularly a polyethylene-based foam, and the 25% compressive strength in the thickness direction is preferably 380 kPa or less and the interlayer strength is preferably 400 mJ/cm$^2$ (39 N/cm) or more.

Patent Literature 4 describes an adhesive tape having an adhesive layer on at least one side of a foam substrate and used for fixing components of a portable electronic device. It is described that this foam substrate is preferably a polyolefin-based foam, particularly a polyethylene-based foam, and the interlayer strength thereof is preferably 20 N/cm or more and the 25% compressive strength is preferably 80 kPa or more.

Patent Document 5 describes an adhesive tape having an adhesive layer on at least one side of a foam substrate and used for fixing components of a portable electronic device. It is described that this foam substrate is preferably a polyolefin-based foam, particularly a polyethylene-based foam, and the 25% compressive strength thereof is preferably 160 kPa or more and the interlayer strength is preferably 13 N/cm or more.

Patent Document 6 describes an adhesive tape having an adhesive layer on at least one side of a foam substrate and used for fixing components of a portable electronic device. It is described that this foam substrate is preferably a polyolefin-based foam, particularly a polyethylene-based foam, and the 25% compressive strength thereof is preferably 250 kPa or more and the interlayer strength is preferably 25 N/cm or more.

Patent Document 7 describes an adhesive tape having an adhesive layer on both sides of a foam substrate and used for fixing of an organic EL display. It is described that this foam substrate is preferably a polyolefin-based foam, particularly a polyethylene-based foam, and the interlayer strength thereof is preferably 10 to 18 N/cm and the 25% compressive strength is preferably 30 kPa or more.

Patent Document 8 describes an adhesive tape having an adhesive layer on at least one side of a foam substrate and used for fixing of a protective panel of a screen display unit or an image display module. It is described that this foam substrate is preferably a polyolefin-based foam, particularly a polyethylene-based foam, and the interlayer strength thereof is preferably 6 to 50 N/cm and the 25% compressive strength is preferably 30 kPa or more.

Patent Literature 9 describes an adhesive tape having an adhesive layer on both sides of a foam substrate and used for fixing components of an electronic device. It is described that this foam substrate is preferably a polyolefin-based foam, particularly a polyethylene-based foam, and the interlayer strength thereof is preferably 10 to 50 N/cm and the 25% compressive strength is preferably 10 to 500 kPa.

However, since the foam substrates of Patent Documents 1 to 9 are made of a relatively hard foam, the compressive strength at the time of high compression is too high, that is, the flexibility at the time of high compression is inferior, and performances such as, for example, impact resistance and, stability when deformed greatly are considered to be poor.

Patent Literature 10 describes a polyolefin-based resin foam sheet used as a heat insulating material of an electronic device, and an adhesive tape having an adhesive layer on at least one side of the sheet. It is described that this polyolefin-based foam sheet is preferably a polyethylene-based resin, and the 50% compressive strength thereof is preferably 120 kPa or less and the proportion of closed cells therein is 70 to 100%.

However, though the foam sheet of Patent Document 10 has low 50% compressive strength, the compressive strength at a compression rate exceeding that is unknown. Hence, the flexibility at the time of high compression is unknown, and it is considered that performances such as, for example, impact resistance and, stability when greatly deformed are poor in some cases.

RELATED ART DOCUMENTS

Patent Document

Patent Document 1: JP 2015-98554
Patent Document 2: JP 2015-187263
Patent Document 3: JP 2016-183274
Patent Document 4: WO 2013/099755
Patent Document 5: WO 2013/141167
Patent Document 6: WO 2013/154137
Patent Document 7: WO 2013/191106
Patent Document 8: WO 2013/176031
Patent Document 9: WO 2014/156816
Patent Document 10: JP 2017-66404

SUMMARY OF INVENTION

Technical Problem

The present invention has been made in order to solve the conventional technical problems described above. That is, an object of the present invention is to provide an adhesive tape which is excellent in flexibility at the time of high compression, and excellent in performances such as, for example, impact resistance and, stability when deformed greatly.

Solution to Problem

The present inventors have conducted intensive studies to achieve the above-described object and resultantly found that it is very effective to set the compressive strength of the adhesive tape having a foam substrate at the time of high compression in a specific range, leading to completion of the present invention.

That is, the present invention is an adhesive tape having an adhesive layer on one side or both sides of a polyolefin-based foam substrate containing closed cells, wherein the 65% compressive strength measured by compressive strength measurement according to JIS K 7181 is 6.0 MPa or less and the 80% compressive strength thereof is 20 MPa or less.

Advantageous Effect of Invention

According to the findings of the present inventors, specifying the adhesive tape having the foam substrate by the compressive strength at the time of high compression is very suitable as an index for evaluating the followability to a curved adherend. This is because the adhesive tape having the foam substrate has a feature that if compressed at the time of pasting, the compressive strength increases sharply from one point at which cells in the foam are fully collapsed, to become harder. The hardened adhesive tape cannot sufficiently follow an adherend when the adherend is curved. The present inventors have paid attention to this point and made it possible to provide an adhesive tape excellent in, for example, impact resistance and stability when deformed greatly (followability to a curved adherend) by suppressing a sudden increase in the compressive strength by setting the compressive strength at the time of high compression to the above-described specific range.

MODES FOR CARRYING OUT THE INVENTION

<Foam Substrate>

Figure 1:
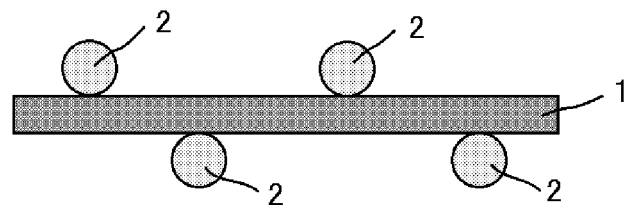
FIG. 1 is a schematic view for explaining a method of measuring the bending moment in Examples and Comparative Examples.

The foam substrate used in the present invention is a substrate made of a foam of a polyolefin-based resin composition. The polyolefin-based resin composition preferably contains an ethylene-vinyl acetate copolymer and another polyolefin-based resin. The ethylene-vinyl acetate copolymer exhibits higher rubber elasticity as compared with linear low-density polyethylenes. Accordingly, if a suitable amount of the ethylene-vinyl acetate copolymer is blended in a polyolefin-based resin composition, rubber elasticity suitable for application of a substrate of an adhesive tape tends to be maintained even if the size of closed cells in the foam substrate is made smaller. As a result, the size of closed cells can be made smaller, and it also becomes easy to control the compressive strength at the time of high compression and the interlayer strength. Meanwhile, as the other polyolefin-based resins, for example, polyethylene-based resins, polypropylene-based resins, or mixtures thereof are listed. Particularly, linear low density polyethylene (LLDPE) and ethylene propylene rubber (EPDM) are more preferable.

The polyolefin-based resin composition can be produced by known methods. For example, it can be obtained by irradiating an electron beam to a resin composition containing an ethylene-vinyl acetate copolymer and any other polyolefin-based resin to crosslink the resin composition. It may be foamed simultaneously with or at a different time from the crosslinking.

The polyolefin-based resin composition may contain other additives as long as the effects of the present invention are not impaired. Specific examples thereof include a bulking agent, a crosslinking agent, an antioxidant, a stabilizer, and a coupling agent. Further, a light-shielding filler and a pigment may be included. Specific examples of the light-shielding filler include carbon black, carbon nanotube, and black inorganic filler. Specific examples of the pigments include carbon black, aniline black, acetylene black and ketjen black.

The polyolefin-based foam substrate contains closed cells. Therefore, the adhesive tape of the present invention is excellent also in water-proofness and dust-proofness. The average cell size of closed cells is preferably 0.04 to 0.45 mm, more preferably 0.10 to 0.35 mm. The density of the foam substrate is preferably from 50 to 300 kg/m$^3$, more preferably from 80 to 200 kg/m$^3$. The foam substrate having such an average cell size and density is a substrate containing a relatively large amount of relatively small closed cells.

The foaming magnification of the foam constituting the polyolefin-based foam substrate is preferably 2.0 to 15-fold, more preferably 4.0 to 12-fold.

The thickness of the polyolefin-based foam substrate is preferably 0.06 to 2.0 mm, more preferably 0.1 to 1.8 mm.

The interlayer strength of the polyolefin-based foam substrate is preferably 7 N/cm or more, more preferably 8 to 17 N/cm. The interlayer strength is an index representing the strength of the foam substrate. The specific method for measuring the interlayer strength is described in the section of Examples.

The tensile elastic modulus of the foam substrate is preferably from 70 to 500 N/mm$^2$, more preferably from 100 to 450 N/mm$^2$. The specific method of measuring the tensile elastic modulus is described in the section of Examples.

The bending moment (bending stiffness) in the MD and TD directions of the substrate is preferably 1 to 35 gf/cm, more preferably 2 to 30 gf/cm. The specific method of measuring the bending moment is described in the section of Examples.

It is better that the foam substrate has no supporting film. It is because when a supporting film is present, a harder film than the foam in all directions such as the thickness direction, flow direction and width direction comes into contact with an adherend, thus, it cannot follow the adherend, in some cases. Here, the supporting film is a film for compensating for a drawback that it is easily stretched when handling a soft foam. For example, a film support foam in which a foam and a supporting film are integrally molded is known as a commercial product.

<Adhesive Layer>

The adhesive layer used in the present invention is not particularly limited. As the adhesive composition constituting the adhesive layer, for example, known various adhesive compositions such as, for example, acrylic type, rubber type, silicone type and urethane type compositions can be used. Above all, an acrylic adhesive composition containing a (meth) acrylate copolymer is preferred from the viewpoints of impact resistance, adhesive strength and waterproofness. On the other hand, the adhesive layer preferably does not contain a tackifying resin. When a tackifying resin is contained, the adhesive is softened to lower impact resistance and adhesiveness, in some cases.

The constituent component of the acrylic adhesive composition is not particularly restricted, but an acrylic copolymer (A) containing 10 to 20% by mass of an alkyl (meth)acrylate (A1) having an alkyl group having 1 to 3 carbon atoms, 50 to 80% by mass of an alkyl (meth)acrylate (A2) having an alkyl group having 4 to 12 carbon atoms, 10 to 15% by mass of a carboxyl group-containing monomer (A3), 0.01 to 0.5% by mass of a hydroxyl group-containing monomer (A4) and 1 to 5% by mass of vinyl acetate (A5) as constituent components of the polymer chain is preferably used as the resin component. In this case, a crosslinking agent capable of reacting with a carboxyl group and/or a hydroxyl group of the acrylic copolymer (A) may be blended to form a cross-linked structure with the acrylic copolymer (A). Further, a silane coupling agent or an antioxidant may be blended in order to improve repulsion resistance.

The thickness of the adhesive layer is preferably 5 to 125 µm, more preferably 10 to 80 µm.

The adhesive layer can be formed, for example, by subjecting the adhesive composition to a crosslinking reaction. The adhesive composition is applied on a substrate, and a crosslinking reaction is caused by heating to form an adhesive layer on the foam substrate. Further, the adhesive composition is applied onto a release paper or another film, cross-linked by heating to form an adhesive layer, and this adhesive layer is pasted to one side or both sides of the foam substrate. For application of the adhesive composition, for example, a coating device such as a roll coater, a die coater, and a lip coater can be used. When heated after application, it is also possible to remove a solvent in the adhesive composition together with the crosslinking reaction by heating.

<Adhesive Tape>

The adhesive tape of the present invention has an adhesive layer on one or both sides of a polyolefin-based foam substrate. The adhesive layer may be formed on only one side of the substrate, but is preferably formed on both sides to form a double-sided adhesive tape.

The thickness of the adhesive tape of the present invention is preferably 0.2 to 2.0 mm, more preferably 0.3 to 2.0 mm. The width of the adhesive tape is preferably 0.8 to 10 mm, more preferably 1 to 5 mm.

In the adhesive tape of the present invention, the 65% compressive strength measured by compressive strength measurement according to JIS K 7181 is 6.0 MPa or less (preferably 0.09 to 5.5 MPa, more preferably 0.15 to 5.0 MPa), and the 80% compressive strength thereof is 20 MPa or less (preferably 0.5 to 17 MPa, more preferably 0.7 to 14 MPa). Further, the 70% compressive strength similarly measured is preferably 7.0 MPa or less (more preferably 0.3 to 6.5 MPa), and the 75% compressive strength thereof is preferably 9.5 MPa or less (more preferably 0.4 to 9.0 MPa). The adhesive tape of the present invention having such a compressive strength is excellent in performances such as, for example, impact resistance and stability when greatly deformed, since a sharp increase in the compressive strength is suppressed.

When the thickness of the foam substrate of the adhesive tape of the present invention is 0.06 mm or more and less than 0.9 mm, the 65% compressive strength of the adhesive tape is 6.0 MPa or less (preferably 0.15 to 5.5 MPa, more preferably 0.3 to 5.0 MPa), and the 80% compressive strength is 20 MPa or less (preferably 2.0 to 17 MPa, more preferably 3.0 to 14 MPa). Further, the 70% compressive strength is preferably 7.0 MPa or less (more preferably 0.8 to 6.5 MPa), and the 75% compressive strength is preferably 9.5 MPa or less (more preferably 1.0 to 9.0 MPa).

When the thickness of the foam substrate of the adhesive tape of the present invention is 0.9 mm or more and 2.0 mm or less, the 65% compressive strength of the adhesive tape is preferably 0.5 MPa or less (more preferably 0.09 to 0.4 MPa, particularly preferably 0.15 to 0.35 MPa), and the 80% compressive strength is preferably 2.5 MPa or less (more preferably 0.5 to 2.0 MPa, particularly preferably 0.7 to 1.5 MPa). Further, the 70% compressive strength is preferably 0.8 MPa or less (more preferably 0.3 to 0.7 MPa), and the 75% compressive strength is preferably 1.3 MPa or less (more preferably 0.4 to 1.0 MPa).

Generally, if the proportion of closed cells in the foam is reduced, the interlayer strength is increased, but the compressive strength of the foam is also increased. Conversely, when the proportion of closed cells is increased, the compressive strength is reduced, but the interlayer strength is also reduced. If the interlayer strength of the foam substrate is low, for example, when an adhesive tape is used for an electronic device, the foam substrate causes interlayer destruction when impact force is applied to the electronic device, which may cause a failure of the electronic device, in some cases. On the other hand, according to the findings of the present inventors, the foam substrate having a relatively small average cell size of closed cells and containing a relatively large number of the small closed cells has a low compressive strength at the time of high compression, and additionally, the interlayer strength is not so low. Hence, in the present invention, it is preferable to use such a type of foam substrate.

EXAMPLES

Hereinafter, the present invention will be described in more detail with reference to Examples and Comparative Examples. In the following description, "parts" means parts by mass, and "%" means % by mass.

Production Examples 1 to 3 of Adhesive Layer

Into a reaction apparatus equipped with a stirrer, a thermometer, a reflux condenser and a nitrogen gas inlet tube were charged the components (A1) to (A5) in the amounts (% by mass) shown in the table, ethyl acetate, and n-decanethiol as a chain transfer agent, and 0.1 part of lauryl peroxide as a peroxide-based radical polymerization initiator. A nitrogen gas was sealed in the reaction apparatus, and the material were polymerized at 68° C. for 3 hours, then, at 78° C. for 3 hours under a nitrogen gas flow while stirring. Thereafter, the mixture was cooled to room temperature, and ethyl acetate was added. As a result, an acrylic copolymer (A) having a solid content of 30% was obtained.

The weight-average molecular weight (Mw) and theoretical Tg of each acrylic copolymer are shown in the table. This weight-average molecular weight (Mw) is a value obtained by measuring the molecular weight of the acrylic copolymer in terms of standard polystyrene by the GPC method using the following measuring apparatus and conditions.

Apparatus: LC-2000 series (manufactured by JASCO Corporation)
Column: Shodex KF-806M×2 columns, Shodex KF-802×1 column
Eluent: tetrahydrofuran (THF)
Flow rate: 1.0 mL/minute
Column temperature: 40° C.
Injection volume: 100 μL
Detector: Refractometer (RI)
Measurement sample: obtained by dissolving an acrylic polymer in THF to prepare a solution in which the concentration of the acrylic polymer was 0.5% by mass, and removing foreign matters by filtration through filter.

The theoretical Tg is a value calculated by the FOX equation.

The abbreviations in Table 1 are as follows.
"MA": methyl acrylate
"2-EHA": 2-ethylhexyl acrylate
"BA": n-butyl acrylate
"AA": acrylic acid
"4-HBA": 4-hydroxybutyl acrylate
"Vac": vinyl acetate Then, to 100 parts of the solid component of each acrylic copolymer (A) were added 0.04 parts of an isocyanate-based cross-linking agent (Coronate (registered trademark) L-45E, 45% solution) manufactured by Nippon Polyurethane Industry Co., Ltd. and 0.001 parts of an epoxy-based cross-linking agent (TEDRAD (registered trademark)-C) manufactured by MITSUBISHI GAS CHEMICAL COMPANY, INC. as a cross-linking agent (B), 0.1 parts of a silane coupling agent (trade name KBM-403) manufactured by Shin-Etsu chemical Co., Ltd. as a silane coupling agent (C) and 0.2 parts of an antioxidant (IRGANOX (registered trademark) 1010) manufactured by BASF as an antioxidant (D), and these were mixed, to prepare an adhesive composition. Further, this adhesive composition was applied on a silicone-treated release paper so that the thickness after drying was 0.075 mm. Then, at 110° C., the solvent was removed and the layer was dried and a cross-linking reaction was caused, to form adhesive layers 1 to 3.

Example 1

A 1.0 mm thick substrate made of a polyethylene (PE)-based foam containing an appropriate amount of an ethylene-vinyl acetate copolymer (EVA) (tensile elastic modulus=141 N/mm$^2$, bending moment=25 gf/cm, foaming magnification=11-fold, average cell size=0.123 mm, density=90 kg/m$^3$) was prepared. Then, the both sides of the substrate were subjected to a corona discharge treatment, and the adhesive layer on the release paper obtained in Production Example 1 was pasted to the both sides of the substrate, and cured at 40° C. for 3 days, to obtain a double-sided adhesive tape.

Examples 2 and 3

A double-sided adhesive tape was obtained in the same manner as in Example 1 except that the adhesive layers obtained in Production Examples 2 and 3 were used as the adhesive layer.

Comparative Example 1

A double-sided adhesive tape was obtained in the same manner as in Example 1 except that a 1.0 mm thick film support polyurethane-based foam (manufactured by S&K POLYTEC Co., Ltd., trade name NANOCELL™ PSR, tensile elastic modulus=5302 N/mm$^2$, bending moment=21

TABLE 1

| No. | Acrylic copolymer (A) in adhesive | | | | | Theoretical Tg (° C.) | Mw (×10$^4$) |
| --- | --- | --- | --- | --- | --- | --- | --- |
| | A1 | A2 | A3 | A4 | A5 | | |
| Pro. Ex. 1 | MA/13 | 2-EHA/70, BA/4.9 | AA/10 | 4-HBA/0.1 | Vac/2 | −62.3 | 130 |
| Pro. Ex. 2 | MA/15 | 2-EHA/68, BA/4.9 | AA/10 | 4-HBA/0.1 | Vac/2 | −60.7 | 127 |
| Pro. Ex. 3 | MA/20 | 2-EHA/65, BA/2.9 | AA/10 | 4-HBA/0.1 | Vac/2 | −57.3 | 128 | gf/cm, foaming magnification=2.4-fold, average cell size=0.063 mm, density=410 kg/m³) was used as the substrate.

The tensile elastic modulus of the substrate and the bending moment of the substrate and the adhesive tape of Examples and Comparative Examples are values measured by the following methods. Table 2 shows the measured values.

(Tensile Elastic Modulus)

The substrate was cut into a strip shape having a width (W) of 10 mm and a length of 70 mm (long side is in the MD direction), and this was used as a test piece. Then, the thickness was measured with a 1/100 dial gauge (N=5), and the average value of five points was defined as the thickness (t), and the cross-sectional area (S) of the test piece was obtained from the following equation.

Cross-sectional area S (mm²)=t×W
t: thickness (mm)
W: width (mm)

According to JIS K7161 2014, a commercial tensile testing machine (manufactured by Toyo Seiki Seisaku-sho, Ltd., device name STROGRAPH V-10C, full scale 50 N) was set to a chuck interval (L) of 20 mm, and upper and lower ends of the test piece were chucked. Thereafter, the test piece was pulled at a pulling speed of 10 mm/min to obtain a tensile load-displacement curve. A linear equation was obtained from the tensile loads when the displacement of the resulting tensile load-displacement curve was 0.05 mm and 0.25 mm. The displacement×(mm) at the time of tensile load F=10 N was obtained from the obtained linear equation, and the tensile elastic modulus as an index of the toughness of the substrate was obtained from the following equation.

Tensile elastic modulus (N/mm²)=(F/S)/(x/L)
F: tensile load=10 (N)
S: sectional area (mm²)
x: displacement (mm) when tensile load=10 N
L: chuck interval=20 (mm)

Each linear equation and tensile elastic modulus are as follows.

Examples 1 to 3

Linear equation y=0.705x+0.01475, tensile elastic modulus 141 N/mm²

Comparative Example 1

Linear equation y=1.9x+0.01, tensile elastic modulus 380 N/mm²

Comparative Example 2

Linear equation y=1.195x+0.0761, tensile elastic modulus 240 N/mm²

Comparative Example 3

Linear equation y=29.65x−1.1825, tensile elastic modulus 5302 N/mm²

(Bending Moment)

The substrate (or double-sided adhesive tape 1) was cut into a strip shape having a width of 38 mm and a length of 50 mm, which was used as a test piece. The obtained test piece was sandwiched by four terminals 2 as shown in FIG. 1. Then, in accordance with JIS P8125, it was installed in a portion that operates during the test of a commercially available Taber stiffness tester (manufactured by Toyo Seiki Seisaku-Sho, Ltd.), and a 10 g weight was attached to the pendulum (up and down), and the scale at a bending speed of 3°/sec and a bending angle of 15° was read, and used as the measured value. Then, the measured values were substituted into the following formula to calculate bending moments (M) in the MD and TD directions.

Bending moment (gf/cm)=38.0 nk/w
n: scale reading (1 for 10 g weight)
k: moment per scale (gf/cm)
w: width of test piece

TABLE 2

| Pro. Ex. No. | Adhesive layer | Substrate | | | | Adhesive tape Bending moment (gf/cm) |
|---|---|---|---|---|---|---|
| | | Material | Thickness (mm) | Tensile elastic modulus (N/mm²) | Bending moment (gf/cm) | |
| E. 1 | 1 | EVA-containing PE-based foam | 1.0 | 141 | MD = 25 TD = 21 | MD = 30 TD = 28 |
| Ex. 2 | 2 | EVA-containing PE-based foam | 1.0 | 141 | MD = 25 TD = 21 | MD = 30 TD = 28 |
| Ex. 3 | 3 | EVA-containing PE-based foam | 1.0 | 141 | MD = 25 TD = 21 | MD = 30 TD = 28 |
| Comp. Ex. 1 | 1 | film supporting PU-based foam | 1.0 | 5302 | MD = 21 TD = 22 | MD = 24 TD = 25 |

<Compressive Strength>

Figure 2:
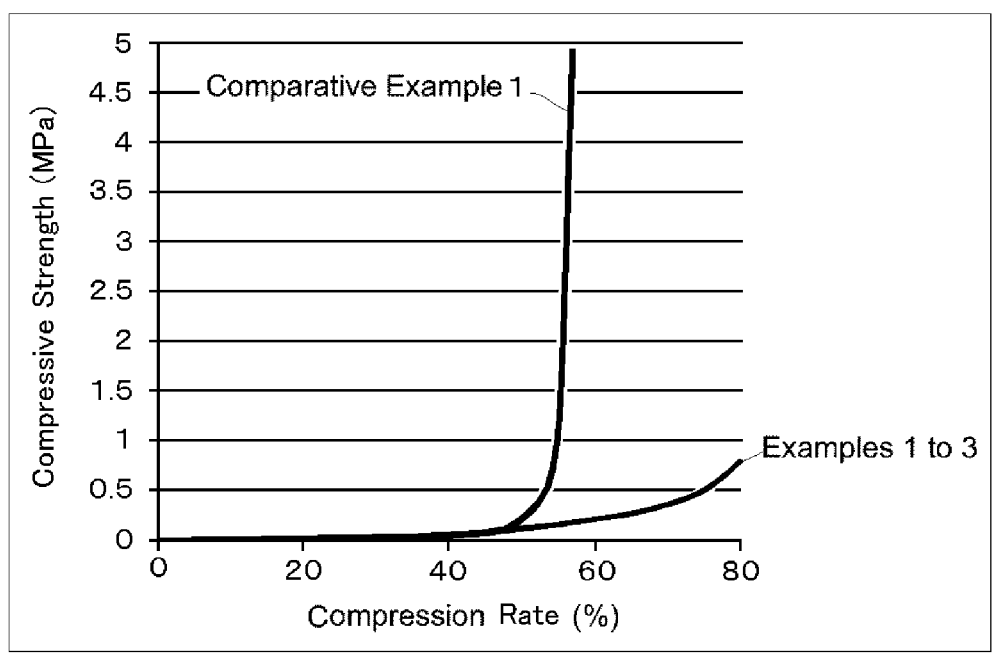
FIG. 2 is a graph showing a master curve in measurement of the compressive strength in Examples 1 to 3 and Comparative Example 1.

The double-sided adhesive tapes obtained in Examples and Comparative Examples were superimposed until the thickness became 12 mm, and the compressive strengths at a compression rate of 0 to 80% were measured according to JIS K 7181 using (Shimadzu Corporation, AG-20kNX) under conditions of the measurement (analysis) software of TRAPEDIUM X and the single measurement mode, and a master curved was made, to obtain compressive strengths at 60%, 65%, 70%, 75% and 80%. The results are shown in Table 3. FIG. 2 shows each master curve of Examples and Comparative examples.

<Interlayer Strength>

On both sides of the double-sided adhesive tape obtained in Examples and Comparative Examples, an aluminum foil treated with alumite on one side was pasted, and pressed by one reciprocation with 2 kg roller. After the pressure bonding, it was cured at 23° C. and 50% Rh for 30 minutes, and the aluminum foil was chucked at upper and lower ends by a commercially available tensile tester (manufactured by Toyo Seiki Seisaku-sho, Ltd., device name: Strograph V1-C, full scale 100N). Thereafter, it was pulled at a pulling speed of 300 mm/min, and the force (N/cm) applied for tearing the foam was measured. The results are shown in Table 3.

TABLE 3

|  | Compressive strength (MPa) | | | | | Interlayer strength N/cm |
|---|---|---|---|---|---|---|
|  | 60% | 65% | 70% | 75% | 80% |  |
| Ex. 1 | 0.19 | 0.26 | 0.34 | 0.50 | 0.82 | 10.24 |
| Ex. 2 | 0.19 | 0.26 | 0.34 | 0.50 | 0.82 | 10.24 |
| Ex. 3 | 0.19 | 0.26 | 0.34 | 0.50 | 0.82 | 10.24 |
| Comp. Ex. 1 | 11.1 | 16.63 | 22.77 | 32.55 | 33.71 | 3.63 |

<Evaluation Test>

The double-sided adhesive tapes obtained in Examples and Comparative Examples were evaluated by the following methods. Table 4 shows the results.

Figure 4:
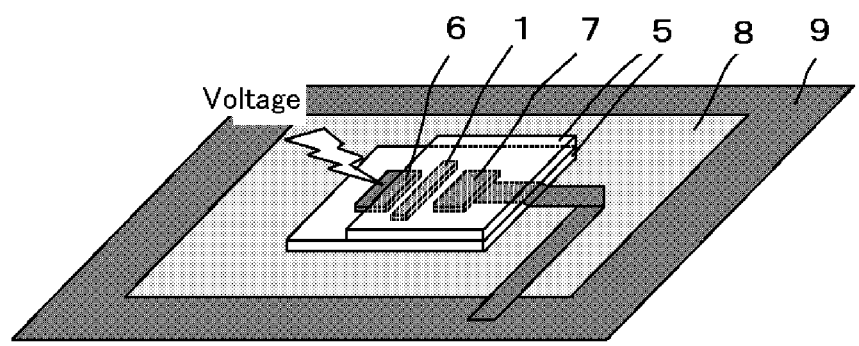
FIG. 4 is a schematic view for explaining a method for evaluating an electrostatic resistance test of Examples.

The double-sided adhesive tape 1 was cut into a strip shape having a width of 0.8 mm and a length of 80 mm, and one release paper was peeled off and pasted to a place between a copper electrode 7 and a copper electrode 8 (distance between electrodes is 1.0 mm) formed on an acrylic plate 6 with a thickness of 2.0 mm×80 mm×120 mm, and further, another release paper was peeled off and pasted to an acrylic plate 6 with a thickness of 2.0 mm×80 mm×80 mm. The sample was subjected to a pressure treatment (0.5 MPa) at 23° C. for 5 seconds using an autoclave. Then, as shown in FIG. 4, the electrostatic resistance of this sample was evaluated based on IEC61000-4-2 (electrostatic resistance standard). Specifically, each voltage was applied to the copper electrode 7 using an electrostatic gun 50 times at each voltage, and the applied voltage (ESD withstand voltage) when current was conducted to the copper electrode 8 side was measured. This sample was placed on a stainless steel table 10 via an insulating sheet 9, and the copper electrode was grounded to the stainless steel table 10.

TABLE 4

|  | Tensile Strength (N/cm) | | Elongation (%) | | 10-Plane drop impact test | | | Electrostatic Resistance (kV) |
|---|---|---|---|---|---|---|---|---|
|  | MD | TD | MD | TD | 0.5 mm width | 1.0 mm width | 2.0 mm width |  |
| Ex. 1 | 14.1 | 12.2 | 397 | 364 | A | A | A | 8 |
| Ex. 2 | 14.1 | 12.2 | 397 | 364 | A | A | A | 8 |
| Ex. 3 | 14.1 | 12.2 | 397 | 364 | A | A | A | 8 |
| Comp. Ex. 1 | 131 | 103 | 116 | 130 | B Foam Destruction on 12-th | A | A | 2 |

(Tensile Strength, Elongation)

The double-sided adhesive tape was cut into a strip shape having a width (W) of 10 mm and a length of 70 mm (long side in the MD direction), and this was used as a test piece. According to JIS K7161 2014, a tensile testing machine (manufactured by Toyo Seiki Seisakusho Co., Ltd., device name STROGRAPH V1-C, full scale 200 N), of which a chuck interval (L) was set to 50 mm, chucked the test piece at upper and lower ends thereof. Thereafter, it was pulled at a pulling speed of 300 mm/min, and the force (N/cm) applied when the adhesive tape was broken and the length (%) of the adhesive tape elongated before breaking were measured.

(10-Plane Drop Impact Test)

Figure 3:
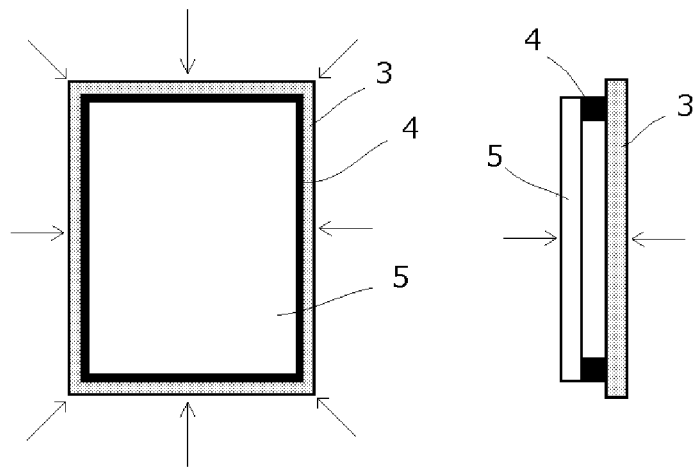
FIG. 3 is a schematic view for explaining a method for evaluating the ten-plane drop impact test of Examples and Comparative examples.

As shown in FIG. 3, the double-sided adhesive tape 4 was cut into a frame of 60 mm×120 mm with a predetermined width (about 1 mm), one of the release papers was peeled off, and pasted to a glass plate 5 having a thickness of 0.5 mm. Then, another release paper was peeled off, and pasted to a polycarbonate plate 3 having a thickness of 1.5 mm. This pasted member was pressed using an autoclave at 23° C. for 5 seconds (0.5 MPa), thereafter, cured under an atmosphere of 23° C. for 24 hours. This pasted member was dropped 20 times from a height of 1 m. The fall was performed so that the parts of the pasted member which collided with the landing area varied each time. Specifically, the parts of the pasted member which collided with the landing area are 10 parts represented by each arrow in FIG. 3. It was evaluated by the following criteria.

"A": No tape peeling occurred even after dropping 20 times.

"B": Tape peeling occurred before dropping 20 times.

(Electrostatic Resistance Test)

Evaluation of Examples 1 to 3 and Comparative Example 1

As is clear from the evaluation results in Table 4, the adhesive tapes of Examples 1 to 3 were excellent in all properties.

On the other hand, the adhesive tape of Comparative Example 1 had too high compressive strength at high compression, that is, the tape had poor flexibility, and thus had poor drop impact resistance. Specifically, in the 10-plane drop impact test, the adhesive tape was peeled off due to the breakage of the foam substrate (foam). Also, the electrostatic resistance was poor.

Example 4

Figure 5:
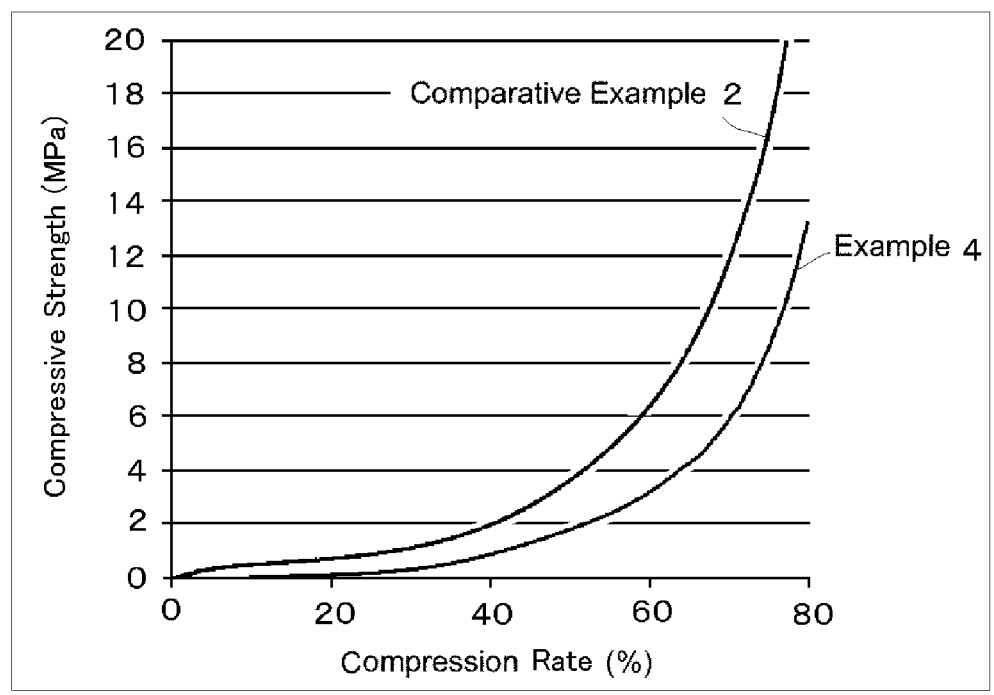
FIG. 5 is a graph showing a master curve in measurement of the compressive strength in Example 4 and Comparative Example 2.

An adhesive tape was fabricated in the same manner as in Example 1 except that a 0.3 mm thick substrate made of a polyethylene (PE)-based foam containing a suitable amount of an ethylene-vinyl acetate copolymer (EVA) (tensile elastic modulus=276 N/mm$^2$, bending moment=3 gf/cm, foaming magnification=5.3-fold, average cell size=0.207 mm, density=186 kg/m$^3$) was used as the substrate. The results are shown in Tables 5 to 7 and FIG. 5.

Comparative Example 2

An adhesive tape was fabricated in the same manner as in Example 1 except that a 0.3 mm thick substrate made of a polyethylene (PE)-based foam containing a suitable amount of an ethylene-vinyl acetate copolymer (EVA) (tensile elastic modulus=215 N/mm$^2$, bending moment=15 gf/cm, foaming magnification=2.7-fold, average cell size=0.188 mm, density=363 kg/m$^3$) was used as the substrate. The results are shown in Tables 5 to 7 and FIG. 5.

TABLE 5

| | Adhesive layer Pro. Ex. No. | Substrate Material | Thickness (mm) | Tensile elastic modulus (N/mm²) | Bending moment (gf/cm) | Adhesive tape Bending moment (gf/cm) |
|---|---|---|---|---|---|---|
| Ex. 4 | 1 | EVA-containing PE-based foam | 0.3 | 276 | MD = 3  TD = 1.5 | MD = 3  TD = 3 |
| Comp Ex. 2 | 1 | EVA-containing PE-based foam | 0.3 | 215 | MD = 15  TD = 15 | MD = 17  TD = 17 |

TABLE 6

| | Compressive strength (MPa) | | | | | Interlayer strength N/cm |
|---|---|---|---|---|---|---|
| | 60% | 65% | 70% | 75% | 80% | |
| Ex. 4 | 3.2 | 4.3 | 6.0 | 8.7 | 13.5 | 8.6 |
| Comp. Ex. 2 | 6.4 | 8.6 | 12.0 | 16.8 | 26.1 | 11.5 |

TABLE 7

| | Tensile Strength (N/cm) | | Elongation (%) | | 10-Plane drop impact test | | | Electrostatic Resistance (kV) |
|---|---|---|---|---|---|---|---|---|
| | MD | TD | MD | TD | 0.5 mm width | 1.0 mm width | 2.0 mm width | |
| Ex. 4 | 14.6 | 7.5 | 164 | 518 | A | A | A | 11 |
| Comp. Ex. 2 | 19.7 | 19.3 | 351 | 473 | B Peeled on 6-th | B Peeled on 11-th | B Peeled on 15-th | 20 |

Evaluation of Example 4 and Comparative Example 2

As is clear from the evaluation results in Table 7, all the properties of the thin adhesive tape of Example 4 were excellent.

On the other hand, the thin adhesive tape of Comparative Example 2 had too high compressive strength at high compression, that is, the tape had poor flexibility, and thus had poor drop impact resistance. Specifically, in the 10-plane drop impact test, peeling of the adhesive tape occurred.

INDUSTRIAL APPLICABILITY

The adhesive tape of the present invention is excellent in flexibility at the time of high compression, and excellent in performances such as, for example, impact resistance, and stability when deformed greatly. Hence, it is useful for various applications in fields where such properties are required. In particular, it can be suitably used in applications of electronic devices such as smartphones, tablet terminals, in-vehicle displays, and TVs, and can be very suitably used particularly in applications of small electronic devices that often receive an impact force due to an accident such as fall.

EXPLANATION OF NUMERAL REFERENCES

1: Double-sided adhesive tape
2: Terminal
3: Polycarbonate plate
4: Double-sided adhesive tape
5: Glass plate
6: Acrylic plate
7: Copper electrode
8: Copper electrode
9: Insulation sheet
10: Stainless steel table

The invention claimed is:

1. An adhesive tape having an adhesive layer on one side or both sides of a polyolefin-based foam substrate containing closed cells, wherein the 65% compressive strength measured by compressive strength measurement according to JIS K 7181 is 6.0 MPa or less and the 80% compressive strength thereof is 20 MPa or less,
    the polyolefin-based foam substrate contains an ethylene-vinyl acetate copolymer and another polyolefin-based resin,
    the density of the polyolefin-based foam substrate is 50 to 300 kg/m³, and
    the closed cells have an average cell size of 0.04 to 0.45 mm.

2. The adhesive tape according to claim 1, wherein the 70% compressive strength measured by compressive strength measurement according to JIS K 7181 is 7.0 MPa or less.

3. The adhesive tape according to claim 1, wherein the 75% compressive strength measured by compressive strength measurement according to JIS K 7181 is 9.5 MPa or less.

4. The adhesive tape according to claim 1, wherein the thickness of the polyolefin-based foam substrate is 0.06 to 2.0 mm.

5. The adhesive tape according to claim 1, wherein the polyolefin-based foam substrate has no supporting film.

6. The adhesive tape according to claim 1, wherein the adhesive layer contains a (meth) acrylate copolymer.

7. The adhesive tape according to claim 1, wherein the adhesive layer does not contain a tackifying resin.

8. The adhesive tape according to claim 1, wherein the interlayer strength of the polyolefin-based foam substrate is 7 N/cm or more.

9. The adhesive tape according to claim 1, which is an adhesive tape for electronic equipment.

* * * * *